Aug. 22, 1939.  I. B. RITTER  2,170,390
ANTISIPHONING TRAP FOR PLUMBING FIXTURES
Filed Oct. 14, 1937  2 Sheets-Sheet 1
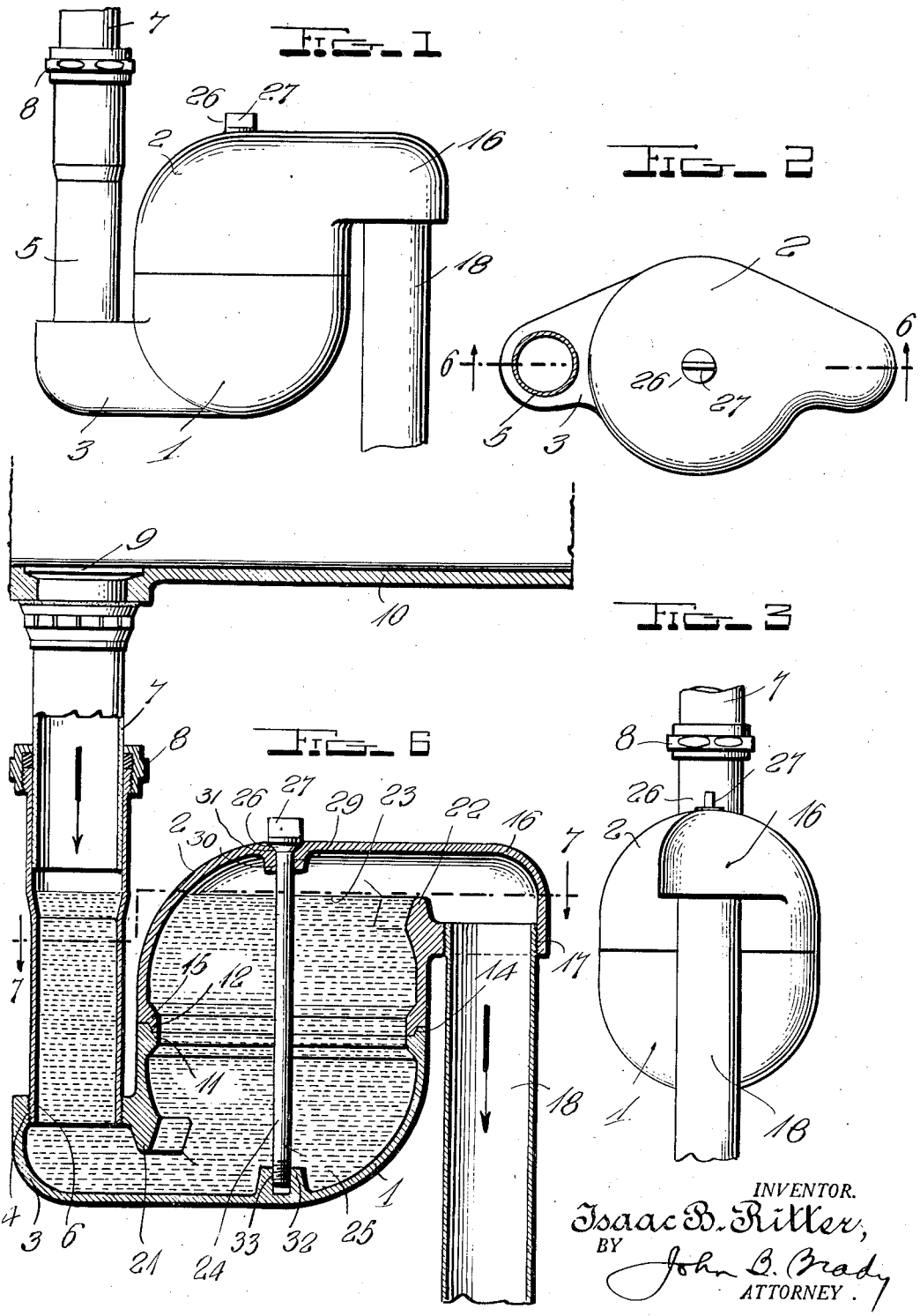
INVENTOR.
Isaac B. Ritter,
BY John B. Brady
ATTORNEY.

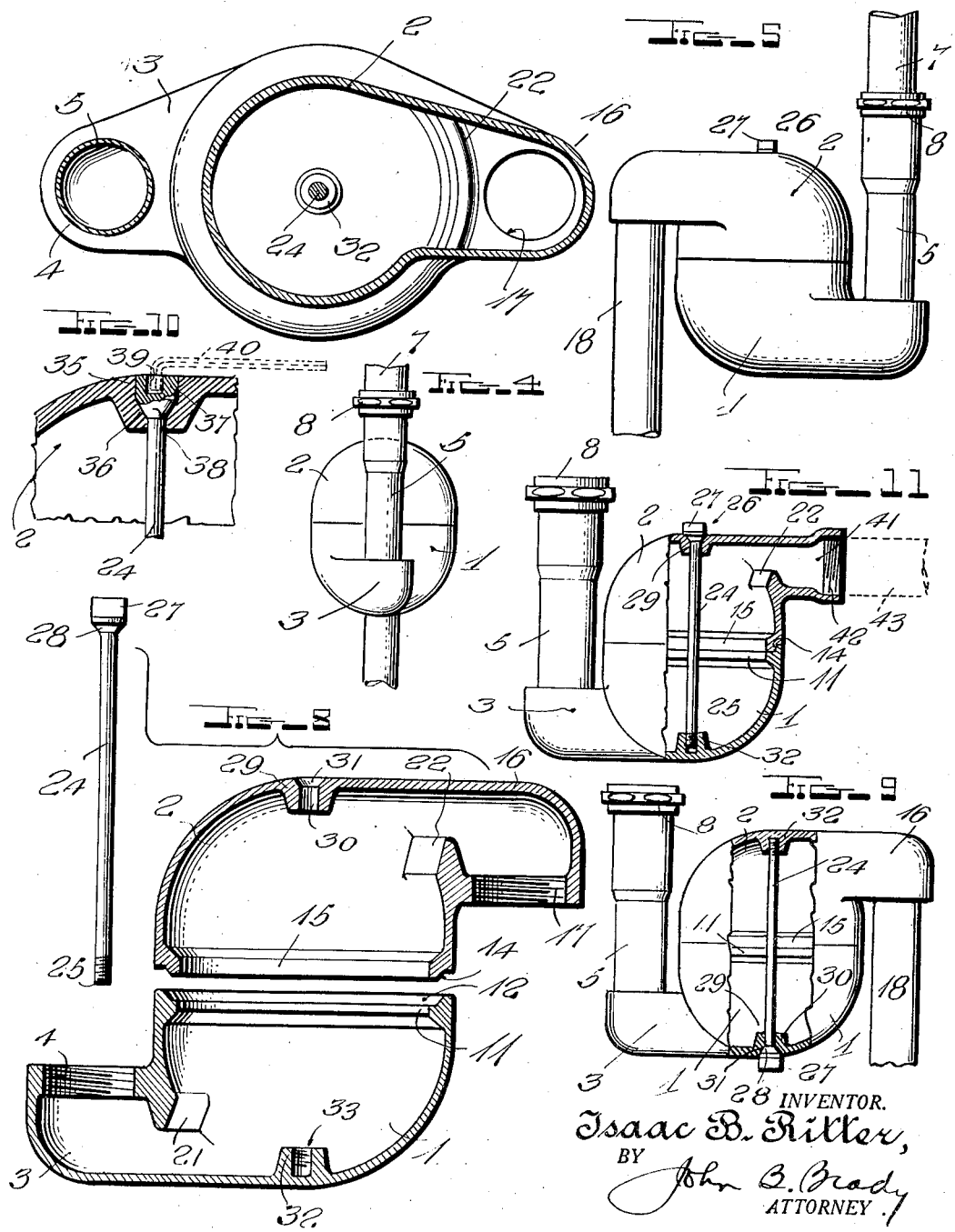

Patented Aug. 22, 1939

2,170,390

UNITED STATES PATENT OFFICE 2,170,390

ANTISIPHONING TRAP FOR PLUMBING FIXTURES

Isaac B. Ritter, Philadelphia, Pa., assignor of one-half to Frank T. Ray, Philadelphia, Pa.

Application October 14, 1937, Serial No. 169,029

4 Claims. (Cl. 182—7)

My invention relates broadly to plumbing fixtures and more particularly to a construction of improved anti-siphoning trap for plumbing fixtures.

One of the objects of my invention is to provide an improved construction of anti-siphoning trap for plumbing fixtures which may be conveniently installed and cleaned from time to time and which will provide a highly effective seal against the seepage of sewer gases.

Another object of my invention is to provide a construction of anti-siphoning trap for plumbing fixtures constituted by a minimum number of coacting parts which may be shifted to various angular positions for facilitating installation of the trap under varying conditions in which space may be very limited.

Still another object of my invention is to provide a construction of anti-siphoning trap in which the liquid seal is maintained at maximum depth within the limits of the trap to improve the effectiveness of the trap against seepage of sewer gases which may result from the tendency of the liquid seal to be siphoned from the trap.

A further object of my invention is to provide an improved construction of anti-siphoning plumbers trap constituted by a pair of substantially hollow members forming complementary portions of an enclosing vessel constituting the anti-siphoning trap.

A still further object of my invention is to provide a construction of plumbers trap formed by a pair of complementary members having an annular interengaging ground surface joint adapted to establish a leak proof seal against the complementary portions of the trap while permitting installation of the inlet and outlet pipes leading to the trap in selected positions.

Another object of my invention is to provide a construction of plumbers trap having a pair of complementary portions angularly shiftable one with respect to another for allowing installation of the inlet and outlet pipes in the required positions without subjecting the pipes to strains and stresses often required in the installation of a solid lead trap detrimental to the structure of the trap.

Still another object of my invention is to provide an improved construction of anti-siphoning trap having complementary parts adapted to be interfitted in sealed relation without the employment of gaskets which tend to wear and develop leaks.

Other and further objects of my invention reside in the construction of two-part anti-siphoning traps and securing means therefor as set forth more fully in the specification hereinafter following by reference to the accompanying drawings in which:

Figure 1 is a front elevation of the anti-siphoning trap of my invention; Fig. 2 is a top plan view of the anti-siphoning trap illustrated in Fig. 1; Fig. 3 is an end elevation of the trap looking at the right hand side of Fig. 2; Fig. 4 is an end elevation of the trap looking at the left hand side of the trap illustrated in Fig. 2; Fig. 5 is a rear elevation of the trap; Fig. 6 is a central vertical longitudinal sectional view on an enlarged scale taken through the anti-siphoning trap of my invention installed with respect to a sink where the outlet pipe extends vertically toward the floor; Fig. 7 is a horizontal sectional view taken on line 7—7 of Fig. 6; Fig. 8 is a view showing the parts of the anti-siphoning trap slightly separated and illustrated in juxtaposition; Fig. 9 shows a modified form of anti-siphoning trap constructed in accordance with my invention with parts broken away and illustrated in section and with securing means for the parts of the trap extending upwardly through the lower portion of the trap and engaging with the upper portion of the trap as distinguished from the assembly arrangement illustrated in Figs. 1–8; Fig. 10 is a fragmentary sectional view of the upper portion of the trap showing the securing means having the head thereof terminating flush with the upper section of the trap and illustrating the manner of assembling the parts by use of a socket wrench adapted to engage the head of the socket recess in the head of the securing means; and Fig. 11 illustrates a further modified construction of anti-siphoning trap having one of the parts thereof connected through an outlet connection with an outlet pipe extending on an axis substantially normal to the axis of the inlet pipe in a substantially horizontal direction toward the waste pipe.

My invention is directed to an anti-siphoning trap for plumbing fixtures in which the inlet and outlet portions of the trap are readily adjusted to various angular positions for facilitating installation of the trap where space may be limited. I eliminate all gaskets from the parts of the trap, thereby reducing the tendency of leakage from the trap. I form the trap from two complementary parts having coacting interfitting ground joints adapted to be slipped laterally with respect to each other but forming a filter tight joint when placed together under control of a bonding member which passes through one of the complementary parts and engages the other of the complementary parts. Each complementary part is provided with a projecting lip adjacent the inlet and outlet connections by which the effective head of the liquid seal is increased for correspondingly increasing the effectiveness of the liquid seal against displacement under conditions of siphoning action and partial vacuum incident thereto. The structure of my invention is adapted both to the N type and the P type. The parts of the trap may be clamped together by a bolt member passing through one of the complementary parts and effecting a ground joint therewith and engaging the interior portion of the other of the complementary parts. The assembling bond or bolt member may extend either upwardly or downwardly and the head thereof may be engageable either by a socket wrench or a wrench adapted to engage the outwardly projecting shaped end of the bond or bolt member. Because of the ease with which the plumber may adjust the angular position of the outlet connection with respect to the inlet connection of the trap, the installation of the trap is greatly facilitated. The mass of fluid enclosed by the vessel formed by the coacting parts and the head of the fluid maintained by the projecting lips adjacent the pipe connections to each of the parts, insure a very substantial liquid seal, preventing siphoning and avoiding unpleasant seepage of gases from the waste pipe.

Referring to the drawings in detail, reference character 1 designates one of the complementary portions of the anti-siphoning trap of my invention which coacts with the complementary portion 2 of the trap. Portion 1 of the trap has a laterally extending portion 3 projecting from the lower extremity of portion 1. The projecting portion 3 has a vertically screw threaded aperture 4 therein into which the vertically disposed inlet pipe 5 is adapted to engage through screw threaded end 6 thereof. The inlet pipe 5 connects at its upper end with sleeve 7. A tight joint is maintained between sleeve 7 and inlet pipe 5 by means of coupling member 8. Sleeve 7 extends downwardly from the drain outlet 9 of sink 10 and delivers the waste to the inlet pipe 5. The portion 1 of the trap is a casting having a special inwardly directed peripheral portion 11 provided with an annular ground surface 12. The ground surface 12 is step-like in formation and is adapted to receive an interfitting complementary shaped ground surface 14 on the peripheral depending joint 15. The ground surface 14 directly engages the ground surface 12 forming a fluid tight joint with respect thereto. However, portion 2 may be slipped laterally with respect to portion 1 for changing the angular position of the outlet with respect to the inlet which is so often necessary in installing the trap in a position beneath a sink in which space is very limited.

The portion 2 of the trap is provided with a laterally extending portion 16 constituting the outlet connection for the trap. The laterally extending portion 16 has a vertically disposed screw threaded aperture 17 therein into which outlet pipe 18 is screw threaded.

The portions 1 and 2 of the trap are each provided with projecting lip members 21 and 22, respectively. The projecting lip members 21 and 22 extend segmentally with respect to the passage through the inlet portion 3 and with respect to the passage through the outlet portion 16. The lips 21 and 22 effectively project into the passages in the respective portions 3 and 16, thereby increasing the effective depth of the liquid seal which I have indicated as having an effective depth 23.

In order to maintain the parts of the anti-siphoning trap in position and insure a liquid tight seal against leakage of fluid from the trap, I provide a bonding member in the form of a bolt 24 having a screw threaded end at 25 and a headed end at 26. The headed end 26 includes a tool engaging portion 27 and an annular bevel face 28 intermediate the tool engaging portion 27 and the shank of the bolt 24. The upper portion 2 of the trap is centrally apertured at 29, the aperture comprising a cylindrical portion 30 and a beveled portion 31 adapted to coact with the annular beveled portion 28 of bolt 24.

The portion 1 of the trap is provided with an upwardly projecting central portion 32 screw threaded at 33 and adapted to be engaged by the screw threaded end 25 of bolt 24 when the parts of the trap are assembled in position. The portions 1 and 2 of the trap may be telescopically fitted one with respect to the other so that ground surface 14 engages ground surface 12. The outlet connection 16 is shifted to the desired angular relationship with respect to inlet connection 3 and then bolt 24 passed through portions 1 and 2 and the screw threaded end 24 engaged in screw threads 33 and the parts drawn together by revolving tool engaging head 27 and establishing a fluid tight frictional connection between annular face 28 of the bolt and bevel face 31 of portion 2 of the trap. This action insures an intimate contact between ground faces 12 and 14 establishing a fluid tight joint.

In certain installations it is more desirable to pass the bolt member 24 in the opposite direction than that shown in Figs. 1–8. In such installations I arrange the bonding member as illustrated in Fig. 9 wherein it will be seen that the screw threaded socket member 32 is formed interiorly of portion 2 of the trap, whereas the passage 30 for bolt 24 is formed integrally with portion 1 of the trap. In this arrangement the annular beveled portion 28 of the bolt establishes a ground joint connection with the bevel face 31 of the inwardly projecting part 29 of the portion 1 of the trap, preventing any seepage of liquid from the trap. The arrangement of Fig. 9 is utilized in installations where it is impractical to assemble and disassemble the trap from the top and where the only available working space is below the trap.

It will be desirable in certain installations to substantially secure the trap against unauthorized disassembly. In Fig. 10 I have shown a modified construction in which portion 2 of the trap is provided with a recess 35 having a beveled portion 36 adapted to receive a conformed head 37 and annular beveled face 38 on bolt 24. The conformed head 37 fits wholly within the recessed portion of the portion 2 of the trap and is flush with the external surface of portion 2 of the trap when the portions 1 and 2 of the trap are drawn together forming a liquid tight seal. A socket 39 is provided in the conformed head 37 for receiving a special wrench 40 by which the bonding member may be assembled and disassembled with respect to the portions of the anti-siphoning trap.

The anti-siphoning trap of my invention may be constructed both in the N type heretofore described and in the P type as illustrated in Fig. 11. The outlet connection illustrated in the modified form shown in Fig. 11 may extend as indicated at 41 on an axis normal to the vertical axis through the bonding member 34. The outlet connection 41 is screw threaded at 42 to receive the outlet pipe 43 leading to the waste line. The position of outlet pipe 41 may be selectively fixed before tightening bond member 24 for maintaining the parts in fluid tight relationship.

The anti-siphoning trap of my invention has been found highly practical in construction, installation and operation. I have disclosed my invention in certain preferred embodiments, but I realize that modifications may be made and I intend no limitations upon my invention other than may be imposed by the scope of the appended claims.

What I claim as new and desire to secure by Letters Patent of the United States is as follows:

1. An anti-siphoning trap comprising a pair of hollow members having interengaging peripheral coacting edge portions forming a fluid tight seal, an inlet connection projecting from one of said members, an outlet connection extending from the other of said members, the angular relation of said inlet and outlet connections being selectable by angularly positioning one of said members with respect to the other of said members, and a segmental lip portion extending transversely within each of said members adjacent the respective inlet and outlet connections thereof, the segmental lip portion adjacent the outlet connection operating to increase the depth of the liquid seal in the enclosure formed by said coacting hollow members.

2. An anti-siphoning trap comprising a pair of hollow members having interengaging peripheral coacting edge portions, each having a ground surface extending in immediate intimate contact one with the other for establishing a fluid tight seal, an inlet connection projecting from one of said members, an outlet connection extending from the other of said members, the angular relation of said inlet and outlet connections being selectable by angularly shifting one of said members with respect to the other of said members, and a segmental lip portion extending transversely within each of said members adjacent the respective inlet and outlet connections thereof, the segmental lip portion adjacent the outlet connection operating to increase the depth of the liquid seal in the enclosure formed by said coacting hollow members.

3. An anti-siphoning trap comprising a pair of substantially similar hollow members, means for joining said members with a fluid tight seal therebetween, an inlet connection in one of said members, an outlet connection in the other of said members, said members forming a chamber with said connections opening therein in vertically opposite positions, and a segmental lip portion extending transversely within each of said members adjacent the respective openings therein of said inlet and outlet connections, the segmental lip portion adjacent the outlet connection operating to increase the depth of fluid forming the liquid seal in said chamber between said inlet and outlet connections.

4. An anti-siphoning trap comprising a hollow body member providing a liquid seal chamber, an inlet connection extending from the lower end of said chamber and an outlet connection extending from the upper end of said chamber, and means comprising segmental lip portions extending transversely in said body member adjacent the said inlet and outlet connections for raising the level of overflow at said outlet connection and lowering the minimum sealing fluid level at said inlet connection for increasing the effective depth of fluid forming the liquid seal in said chamber.

ISAAC B. RITTER.